US011872552B2

(12) United States Patent
Neese et al.

(10) Patent No.: US 11,872,552 B2
(45) Date of Patent: Jan. 16, 2024

(54) HIGH AND LOW VOLUME PRECISION PIPETTOR WITH IMPROVED ACCURACY

(71) Applicant: Beckman Coulter, Inc., Brea, CA (US)

(72) Inventors: Charles Neese, Pittsboro, IN (US); Matthew S. Davis, Indianapolis, IN (US)

(73) Assignee: Beckman Coulter, Inc., Brea, CA (US)

( * ) Notice: Subject to any disclaimer, the term of this patent is extended or adjusted under 35 U.S.C. 154(b) by 496 days.

(21) Appl. No.: 17/271,278

(22) PCT Filed: Aug. 30, 2019

(86) PCT No.: PCT/US2019/049146
§ 371 (c)(1),
(2) Date: Feb. 25, 2021

(87) PCT Pub. No.: WO2020/047463
PCT Pub. Date: Mar. 5, 2020

(65) Prior Publication Data

US 2021/0252497 A1 Aug. 19, 2021

Related U.S. Application Data

(60) Provisional application No. 62/726,063, filed on Aug. 31, 2018.

(51) Int. Cl.
*G01N 1/00* (2006.01)
*B01L 3/02* (2006.01)

(52) U.S. Cl.
CPC ....... *B01L 3/0224* (2013.01); *B01L 2200/023* (2013.01); *B01L 2200/025* (2013.01);
(Continued)

(58) Field of Classification Search
None
See application file for complete search history.

(56) References Cited

U.S. PATENT DOCUMENTS 4,593,837 A * 6/1986 Jakubowicz .......... B01L 3/0275
422/931
4,679,446 A * 7/1987 Sheehan ............... B01L 3/0217
604/218
(Continued)

FOREIGN PATENT DOCUMENTS

CA 2363301 A1 5/2002
CH 679015 12/1991
(Continued)

OTHER PUBLICATIONS

"International Application Serial No. PCT/US2019/049146, International Search Report dated Nov. 13, 2019", 5 pgs.
(Continued)

*Primary Examiner* — Brandi N Hopkins
*Assistant Examiner* — Nigel H Plumb
(74) *Attorney, Agent, or Firm* — Schwegman Lundberg & Woessner, P.A.

(57) ABSTRACT

A pipetting device is disclosed. The pipetting device can include a piston with a stepped profile. The piston can be inserted into a barrel and can have at least two seal elements. The pipetting device can operate in a low volume dispense mode and a high volume dispense mode. The pipetting device can allow for high volumes of liquids to be transferred and also provide for the ability to transfer low volumes of liquids with high precision and accuracy without the need for two or more separate pipettor devices.

15 Claims, 7 Drawing Sheets

(52) U.S. Cl.
CPC . *B01L 2300/0681* (2013.01); *B01L 2300/087* (2013.01); *B01L 2400/0478* (2013.01)

(56) References Cited

U.S. PATENT DOCUMENTS

| | | | | |
|---|---|---|---|---|
| 5,413,006 A * | 5/1995 | D'Autry | ............... | B01L 3/0224 73/864.18 |
| 2003/0223910 A1 | 12/2003 | Jackson et al. | | |
| 2011/0182782 A1 | 7/2011 | Dzuong | | |

FOREIGN PATENT DOCUMENTS

| | | | |
|---|---|---|---|
| CN | 101365540 | | 2/2009 |
| CN | 101466614 | A | 6/2009 |
| CN | 201329284 | | 10/2009 |
| CN | 204051711 | U | 12/2014 |
| CN | 205274231 | | 6/2016 |
| CN | 106103687 | | 11/2016 |
| CN | 112930229 | B | 9/2022 |
| DE | 4104831 | A1 | 10/1992 |
| EP | 0562358 | | 9/1993 |
| EP | 0591038 | | 4/1994 |
| GB | 1340113 | | 12/1973 |
| GB | 1395424 | A | 5/1975 |
| JP | S61212336 | A | 9/1986 |
| JP | 2007327765 | A | 12/2007 |
| JP | 5087820 | B2 | 9/2012 |
| JP | 2015034764 | A | 2/2015 |
| JP | 6205662 | B2 | 9/2017 |
| KR | 20080044929 | | 5/2008 |
| KR | 20210052505 | | 5/2021 |
| WO | WO-2018132376 | A1 | 7/2018 |
| WO | WO20181322376 | * | 7/2018 |
| WO | WO-2020047463 | A1 | 3/2020 |

OTHER PUBLICATIONS

"International Application Serial No. PCT/US2019/049146, Written Opinion dated Nov. 13, 2019", 7 pgs.

"International Application Serial No. PCT US2019 049146, International Preliminary Report on Patentability dated Mar. 11, 2021", 9 pages.

"Chinese Application Serial No. 201980068563.5, Office Action dated Jan. 29, 2022", with English translation, 25 pages.

"Indian Application Serial No. 202147008811, First Examination Report dated Mar. 11, 2022", with English translation, 6 pages.

"Chinese Application Serial No. 201980068563.5, Response filed Jun. 13, 2022 to Office Action dated Jan. 29, 2022", with English translation of claims, 19 pgs.

"European Application Serial No. 19769652.9, Response filed Oct. 22, 2021 to rules 161(1) and 162 EPC dated Apr. 12, 2021", 12 pgs.

"Singapore Application Serial No. 11202103018Q, Written Opinion dated Apr. 27, 2022", with English translation of claims, 14 pgs.

"Chinese Application Serial No. 201980068563.5, Response filed Jun. 23, 2022 to Office Action dated Jun. 21, 2022", w/ English claims, 15 pgs.

"Indian Application Serial No. 202147008811, Response filed Sep. 10, 2023 to First Examination Report dated Mar. 11, 2022", 100 pgs.

"Japanese Application Serial No. 2021-510447, Notification of Reasons for Refusal dated Sep. 1, 2023", w/ English Translation, 8 pgs.

"Singapore Application Serial No. 11202103018Q, Response filed Sep. 5, 2022 to Written Opinion dated Apr. 27, 2022", with English translation of claims.

"Canadian Application Serial No. 3,110,855, Examiners Rule 86(2) Requisition dated Oct. 18, 2023", 6 pgs.

* cited by examiner

HIGH AND LOW VOLUME PRECISION PIPETTOR WITH IMPROVED ACCURACY

CROSS-REFERENCES TO RELATED APPLICATIONS

This application is a U.S. National Stage Filing under 35 U.S.C. 371 from International Application No. PCT/US2019/049146, filed on Aug. 30, 2019, and published as WO 2020/047463 on Mar. 5, 2020, which application claims the benefit of U.S. Provisional Appl. Ser. No. 62/726,063, filed Aug. 31, 2018, which are incorporated by reference as if fully set forth herein.

BACKGROUND

The typical approach to having both high volume pipetting capability and low volume capability with precision and accuracy is to have two or more separate pipettor devices that are used interchangeably. This increases the cost and complexity of the pipetting system, and users have to choose between high volume and low volume pipetting. Users cannot pipette the other volume range without swapping out pipettor devices. Swapping out pipettor devices is more complex, requires more components, and is more time consuming.

Embodiments of the invention address these and other challenges, individually and collectively.

BRIEF SUMMARY

Embodiments of the invention are directed to devices and methods for pipetting liquids in high and low volume modes. In embodiments of the invention, a single pipettor device allows for high volumes of liquids to be transferred, yet provide for the ability to also transfer low volumes of liquids with high precision and accuracy without the need for two or more separate pipettor devices.

One embodiment of the invention is directed to a device for transferring liquid comprising: a piston (104); and a barrel (102) including a barrel body (102A), and a tip (122) formed in the barrel body (102A), the barrel (102) including a larger diameter segment (102A) extending from a smaller diameter segment (102B), wherein the barrel (102) comprises a larger diameter segment (102A) and a smaller diameter segment (102B), and is configured to engage a first pipette tip (130) sized to fit over the larger diameter segment (102A), and wherein the barrel (102) is further configured to engage a second pipette tip (132) sized to fit over the smaller diameter segment (102B) of the barrel (102). In some embodiments, the piston (104) may include a stepped profile, a drive rod portion (104B) and a free end portion (104C) extending from the drive rod portion (104B), the free end portion (104C) having a different diameter than the drive rod portion (104B), wherein the barrel (102) includes a stepped bore (108) defined by the barrel body (102A), the stepped bore (108) having an axial hole (108A) and a coaxial counterbore (108B), the axial hole (108A) passing through the tip (122), and wherein the device may further include a first seal element (112) between and engaging the barrel (102) and the free end portion (104C); and wherein the device may further include a second seal element (114) between and engaging the barrel (102) and the drive rod portion (104B). In some embodiments, a length of the free end portion may be greater than a length of the axial hole (108A). In some embodiments, the stepped bore (108) may further include a bore portion (108C), wherein a diameter of the bore portion (108C) is smaller than a diameter of the counterbore (108B) and is larger than a diameter of the axial hole (108A), and wherein the first seal element (112) is fixed within the bore portion (108C). In some embodiments, the smaller diameter segment (102B) may coincide with the tip (122), and the larger diameter segment (102A) may extend from the smaller diameter segment (102B), and the counterbore (108B) may be disposed within the larger diameter segment (102A). In some embodiments, the device may further include a shuck plate (142) disposed about the barrel (102) and configured to move axially with respect to the barrel (102). In some embodiments, the second pipette tip (132) may have a body (132A) forming a lumen (132B), and a barrier (140) spanning the lumen (132B), the second pipette tip (132) engaging the barrel (102), and wherein, when the second pipette tip (132) is engaged to the barrel (102), an end of the free end portion (104C) can contact the barrier (140). In some embodiments, the device may further include a shuck plate (142), wherein when the second pipette tip (132) is engaged to the barrel (102), the shuck plate (142) contacts the second pipette tip (132). In some embodiments, the piston 104 may further include an engagement portion (104A) extending from the drive rod portion (104B). In some embodiments, the device may further include an actuator coupled to the piston (104) for moving the piston up and down. The device may further include a gripper having at least two gripper fingers (702, 704), wherein the actuator is further coupled to the gripper for moving the at least two gripper fingers (702, 704). In some embodiments, the piston (104) may be disposed within the barrel (102) such that at most one of the first seal element (112) and the second seal element (114) engages between the barrel (102) and the piston (104). In some embodiments, the second pipette tip (132) may include a filter barrier (140) that can be pushed by the piston (104) to separate the second pipette tip (132) from the barrel (102).

Another embodiment of the invention is directed to a method of using a device for transferring a liquid comprising (a) a piston (104), and (b) a barrel (102) including a barrel body (102A), and a tip (122) formed in the barrel body (102A), the barrel (102) including a larger diameter segment (102A) and a smaller diameter segment (102B), wherein the barrel (102) is configured to engage a first pipette tip (130) sized to fit over the larger diameter segment (102A), and wherein the barrel (102) is further configured to engage a second pipette tip (132) sized to fit over the smaller diameter segment (102B) of the barrel (102), the method comprising: in a first high volume pipetting mode, aspirating a first liquid by withdrawing the piston (104) from the barrel (102), and dispensing the first liquid using the first pipette tip (130); and in a second low volume pipetting mode, aspirating, a second liquid by withdrawing the piston (104) from the barrel (102), and dispensing the second liquid using the second pipette tip (132). In some embodiments, the piston (104) may include a stepped profile, a drive rod portion (104B) and a free end portion (104C) extending from the drive rod portion (104B), the free end portion (104C) having a different diameter than the drive rod portion (104B), the barrel (102) including a stepped bore (108) defined by the barrel body (102A), the stepped bore (108) having an axial hole (108A) and a coaxial counterbore (108B), the axial hole (108A) passing through the tip (122), a first seal element (112) between and engaging the barrel (102) and the free end portion (104C), and a second seal element (114) between and engaging the barrel (102) and the drive rod portion (104B), and wherein in the first high volume pipetting mode, the first liquid is aspirated by withdrawing the piston (104) from the barrel (102) such that the free end portion (104C) is above and moves away from the axial hole (108A), and the first liquid is dispensed by dispensing the first liquid by inserting the piston (104) into the barrel (102) such that the free end portion (104C) moves toward the axial hole (108A); and wherein in a second low volume pipetting mode, the second liquid aspirated by withdrawing the piston (104) from the barrel (102) such that the free end portion (104C) remains in the axial hole (108A), and the second liquid is dispensed by inserting the piston (104) into the barrel (102) such that the free end portion (104C) remains in the axial hole (108A). In some embodiments, the device may further include a shuck plate (142) disposed about the barrel and configured to move axially with respect to the barrel (102). In some embodiments, the method may further include removing the first pipette tip (130) from the barrel (102) using a shuck plate (142). In some embodiments, the method may further include removing the second pipette tip (132) from the barrel (102) using the shuck plate (142). In some embodiments, a length of the free end portion (104B) is greater than a length of the axial hole (108A). In some embodiments of the method, the stepped bore (108) may further include a bore portion (108C), wherein a diameter of the bore portion (108C) is smaller than a diameter of the counterbore (108B) and is larger than a diameter of the axial hole (108A), and wherein the first seal element (112) is fixed within the bore portion (108C). In some embodiments, the piston (104) further comprises an engagement portion (104A) extending from the drive rod portion (104B). In some embodiments, the method may further comprise using an actuator to withdraw and insert the piston (104) in the high and low volume pipetting modes.

Another embodiment of the invention is directed to a device for transferring liquid comprising: a piston (104); and a barrel (102) including a barrel body (102A), and a tip (122) formed in the barrel body (102A), wherein the barrel (102) is configured to engage a pipette tip (132) comprising a structure that can be pushed by the piston to separate the pipette tip (132) from the barrel (102). In some embodiments, the device may be a pipetting device. In some embodiments, the structure may be a filter barrier (140). In some embodiments, the device, the pipette tip (132) is a second pipette tip and wherein the barrel (102) may be further configured to engage a first pipette tip (130), the first pipette tip having a different diameter than the second pipette tip (132). In some embodiments, the device may further include a shuck plate (142) configured to separate the first pipette tip (130) from the barrel (102). In some embodiments, the device may include the pipette tip.

Another embodiment of the invention is directed to a method for using a device comprising: a piston (104); and a barrel (102) including a barrel body (102A), and a tip (122) formed in the barrel body (102A), wherein the barrel (102) is configured to engage a pipette tip (132) comprising a structure that can be pushed by the piston to separate the pipette tip (132) from the barrel (102), the method comprising: aspirating a liquid into the barrel (102) while the pipette tip (132) is on the barrel (102); dispensing the liquid via the pipette tip (132); and separating the pipette tip (132) from the barrel (102) by pushing the structure with the piston (104). In some embodiments, the structure may be a filter barrier. In some embodiments, the pipette tip (132) is a second pipette tip and wherein the barrel (102) may be configured to engage a first pipette tip (130), the first pipette tip having a different diameter than the second pipette tip (132). In some embodiments, the method includes: attaching the first pipette tip (130) to the barrel (102); aspirating a second liquid into the barrel (102) using the first pipette tip (130); dispensing the second liquid from the barrel (102) via the first pipette tip (130); and separating the first pipette tip (130) from the barrel (102).

Another embodiment of the invention is directed to a device for transferring a liquid comprising: a piston (104) including a stepped profile, a drive rod portion (104B) and a free end portion (104C) extending from the drive rod portion (104B), the free end portion (104C) having a smaller diameter than the drive rod portion (104B); a barrel (102) including a barrel body (102A), a stepped bore (108) defined by the barrel body (102A), and a tip (122) formed in the barrel body (102A), the stepped bore (108) having an axial hole (108A) and a coaxial counterbore (108B), the axial hole (108A) passing through the tip (122); a first seal element (112) between and engaging the barrel (102) and the free end portion (104C); and a second seal element (114) between and engaging the barrel (102) and the drive rod portion (104B). In some embodiments, a length of the free end portion may be greater than a length of the axial hole (108A). In some embodiments the stepped bore (108) may further include a bore portion (108C), wherein a diameter of the bore portion (108C) is smaller than a diameter of the counterbore (108B) and is larger than a diameter of the axial hole (108A), and wherein the first seal element (112) is fixed within the bore portion (108C). In some embodiments, the barrel (102) may further include a stepped exterior profile having a smaller diameter segment (102B) coinciding with the tip (122), and a larger diameter segment (102A) extending from the smaller diameter segment (102B), the counterbore (108B) disposed within the larger diameter segment (102A). In some embodiments, the device may further include a shuck plate (142) disposed about the barrel and configured to move axially with respect to the barrel (102). In some embodiments, the barrel (102) may be configured to engage a second pipette tip (132), the second pipette tip (132) having a body (132A) forming a lumen (132B), and a barrier (140) spanning the lumen (132B), the second pipette tip (132) engaging the barrel (102), and the device configured to project the free end portion (104C) beyond the tip (122) of the barrel (102), and wherein, when the second pipette tip (132) is engaged to the barrel (102), an end of the free end portion (104B) contacts the barrier (140). In some embodiments, the barrel may be further configured to engage a second pipette tip (132) sized to fit over the smaller diameter segment (102B) of the barrel (102). In some embodiments, the device may further include a shuck plate (122), wherein the shuck plate (122) contacts the second pipette tip (132). In some embodiments, the piston 104 may further include an engagement portion (104A) extending from the drive rod portion (104B). In some embodiments, the device may further include an actuator coupled to the piston (104) capable of moving the piston up and down. In some embodiments, the piston (104) may be disposed within the barrel (102) such that at most one of the first seal element (112) and the second seal element (114) engages between the barrel (102) and the piston (104).

Another embodiment of the invention is directed to a method of using a device for transferring a liquid. The device comprises (a) a piston (104) including a stepped profile, a drive rod portion (104B) and a free end portion (104C) extending from the drive rod portion (104B), the free end portion (104C) having a smaller diameter than the drive rod portion (104B), (b) a barrel (102) including a barrel body (102A), a stepped bore (108) defined by the barrel body (102A), and a tip (122) formed in the barrel body (102A), the stepped bore (108) having an axial hole (108A) and a coaxial counterbore (108B), the axial hole (108A) passing through the tip (122), (c) a first seal element (112) between and engaging the barrel (102) and the free end portion (104C), and (d) a second seal element (114) between and engaging the barrel (102) and the drive rod portion (104B). The method comprises: in a first high volume pipetting mode, aspirating a first liquid by withdrawing the piston (104) from the barrel (102) such that the free end portion (104C) is above and moves away from the axial hole (108A), and dispensing the first liquid by inserting the piston (104) into the barrel (102) such that the free end portion (104C) moves toward the axial hole (108A); and in a second low volume pipetting mode, aspirating, a second liquid by withdrawing the piston (104) from the barrel (102) such that the free end portion (104C) remains in the axial hole (108A), and dispensing the second liquid by inserting the piston into the barrel (102) such that the free end portion (104C) remains in the axial hole (108A). In some embodiments, the method may further include: attaching a high volume pipette tip to the tip (122) of the barrel (102); and in the second low volume pipetting mode, attaching a low volume pipette tip to the tip (122) of the barrel (102). In some embodiments, the device may further include a shuck plate (142) disposed about the barrel and configured to move axially with respect to the barrel (102). In some embodiments, the method may further include removing the high volume pipette tip using the shuck plate. In some embodiments, the method may further include removing the low volume pipette tip using the shuck plate. In some embodiments, a length of the free end portion may be greater than a length of the axial hole (108A). In some embodiments, the stepped bore (108) may further include a bore portion (108C), wherein a diameter of the bore portion (108C) is smaller than a diameter of the counterbore (108B) and is larger than a diameter of the axial hole (108A), and wherein the first seal element (112) is fixed within the bore portion (108C). In some embodiments, the piston (104) may further include an engagement portion (104A) extending from the drive rod portion (104B). In some embodiments, the method may further include using an actuator to withdraw and insert the piston (104) in the high and low volume pipetting modes.

These and other embodiments of the invention are described in further detail below, with reference to the drawings.

BRIEF DESCRIPTION OF THE DRAWINGS

In the Figures, like numerals indicate like elements and some descriptions of some elements may not be repeated.

DETAILED DESCRIPTION

Embodiments of the invention are directed to devices and methods for pipetting liquids in high and low volume modes. In embodiments of the invention, a single pipettor device allows for high volumes of liquids to be transferred yet provides for the ability to also transfer low volumes of liquids with high precision and accuracy without the need for two or more separate pipettor devices.

A large volume liquid transfer mode may be for primary sample aspiration and DNA extraction. A low volume liquid transfer mode may be used for nucleic acid transfer and preparation for PCR.

Figure 1:
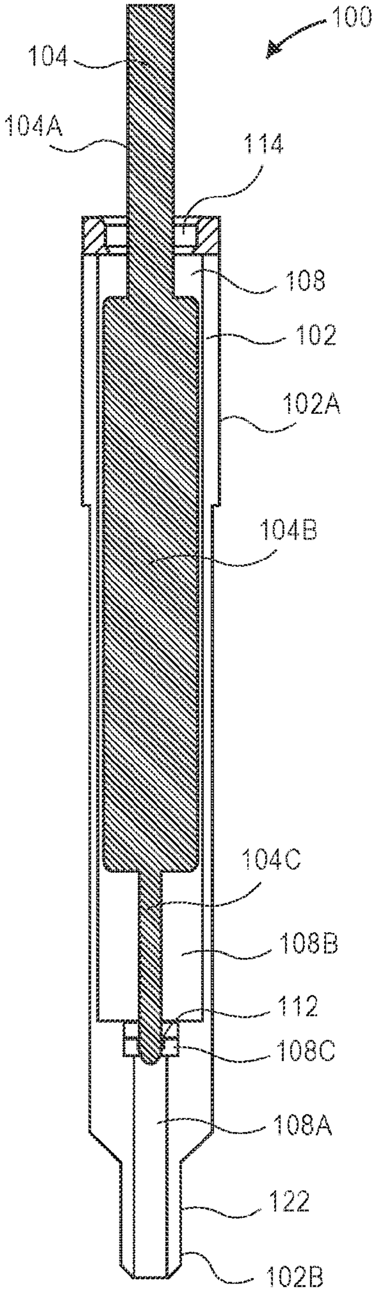
FIG. 1 shows a side, cross-sectional view of a device according to an embodiment of the invention. The device is shown in a configuration to do low volume, low variation pipetting.

FIG. 1 shows a device 100 according to an embodiment of the invention. The device 100 can be used to transfer two or more liquids at different volumes. The device 100 and its components may include any suitable dimensions. For example, the length of the device 100 can be about 3 inches or greater in some embodiments.

The device 100 can include a piston 104 including a stepped profile. The piston 104 can be a unitary or monolithic part, and can include an engagement portion 104A, a drive rod portion 104B and a free end portion 104C extending from the drive rod portion 104B. The free end portion 104C has a smaller diameter than the drive rod portion 104B and the engagement portion 104A. The engagement portion 104A can have a smaller diameter than the drive rod portion 104B. The engagement portion 104A can be of any suitable length, including about 0.5 inches or more.

The piston 104 can include any suitable materials. For example, the piston may comprise plastic such as PTFE (polytetrafluoroethylene).

The device 100 can also include a barrel 102 including a barrel body 102A, a stepped bore 108 defined by the barrel body 102A, and a tip 122 formed in the barrel body 102A. The stepped bore 108 can have multiple discrete sections, including an axial hole 108A, a bore portion 108C, and a coaxial counterbore 108B. The axial hole 108A passes through the tip 122. As shown, the barrel 102 further includes a stepped exterior profile having a smaller diameter segment 102B, which may coincide with the tip 122 and a larger diameter segment, which may be part of a larger portion of the barrel body 102A, extending from the smaller diameter segment 102B. The counterbore 108B is disposed within the larger diameter segment.

The barrel 102 can comprise any suitable material. For example, the barrel 102 may comprise plastic such as PTFE (polytetrafluoroethylene).

The device 100 may include a number of seal elements. The device 100 includes a first seal element 112 that can be in the bore portion 108C, and can be between and engage the barrel 102 and the free end portion 104C of the piston 104. A diameter of the bore portion 108C is smaller than a diameter of the counterbore 108B and is larger than a diameter of the axial hole 108A. As shown, the first seal element 112 can be fixed within the bore portion 108C. A small chamber for pipetting a small volume of liquid can be formed by the axial hole 108A, the first seal element 112, and the free end portion 104C. The first seal element 112 can include any suitable height, including about 0.05 inches or more.

A second seal element 114 can be near the top of the device 100, and can be between and engage the barrel 102 and the drive rod portion 104B of the piston 104. The second seal element 114 can include any suitable height, including about 0.125 inches or more.

The first and second seal elements 112, 114 may comprise any suitable material. For example, the first and second seal elements 112, 114 may comprise rubber.

The piston 104 is disposed within the barrel 102 such that at most one of the first seal element 112 and the second seal element 114 engages the barrel 102 and the piston 104.

An actuator (not shown) can engage the engagement portion 104A of the piston 104. The actuator can move so that the piston 104 is inserted into the barrel 102 to dispense any liquid in the barrel 102 of the device 100. The actuator can also move so that the piston 104 is withdrawn from the barrel 102 of the device 100 to aspirate any liquid into the barrel 102 of the device 100.

The device 100 can pipette any suitable volume of liquid in the high volume pipetting mode and in the low volume pipetting mode. For example, in the high volume pipetting mode, the device 100 can pipette between about 0-5000 microliters of liquid. In the low volume pipetting mode, the device 100 can pipette between about 0-60 microliters of liquid. It is noted that these quantities are merely exemplary and the device 100 can pipette any suitable volumes of liquid so long as the amount of liquid that can be pipetted in the low volume pipetting mode is less than the high volume pipetting mode.

The device 100 in FIG. 1 is shown in a low volume pipetting mode wherein only the axial hole 108A is filled with the liquid to be dispensed. The first seal element 112 and the free end portion 104C prevent any liquid from passing to the coaxial counterbore 108B in the low volume pipetting mode.

Figure 2:
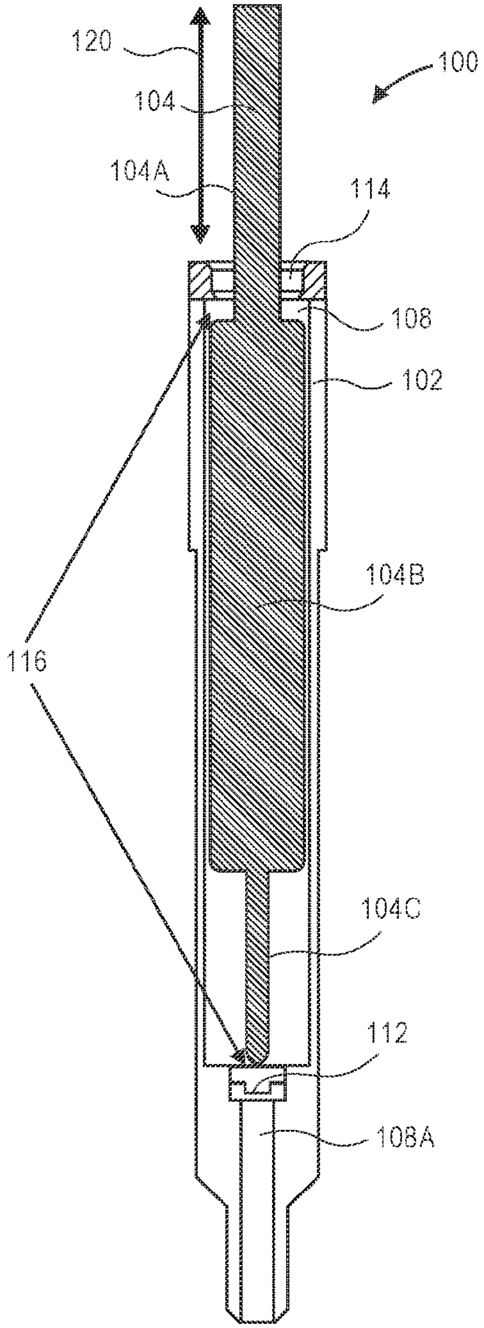
FIG. 2 shows a side, cross-sectional view of the device of FIG. 1. The device is shown in a configuration where the device is in a transition zone (no pipetting).

FIG. 2 shows a side, cross-sectional view of the device 100 of FIG. 1. The device 100 is shown in a configuration where the device is in a transition zone (no pipetting) to convert the device 100 to a high volume pipetting mode. As shown, the end of the free end portion 104C of the piston 104 remains above the first seal element 112, so that the first seal element does not engage the free end portion 104C. The drive rod portion 104B also does not engage the second seal element 114. As a result, liquid can be drawn into the coaxial counterbore 108B if the piston 104 moves away from the axial hole 108A. A liquid can be dispensed from the coaxial counterbore 108B if the piston 104 moves towards the axial hole 108A to push any liquid out of the tip 122.

Figure 3:
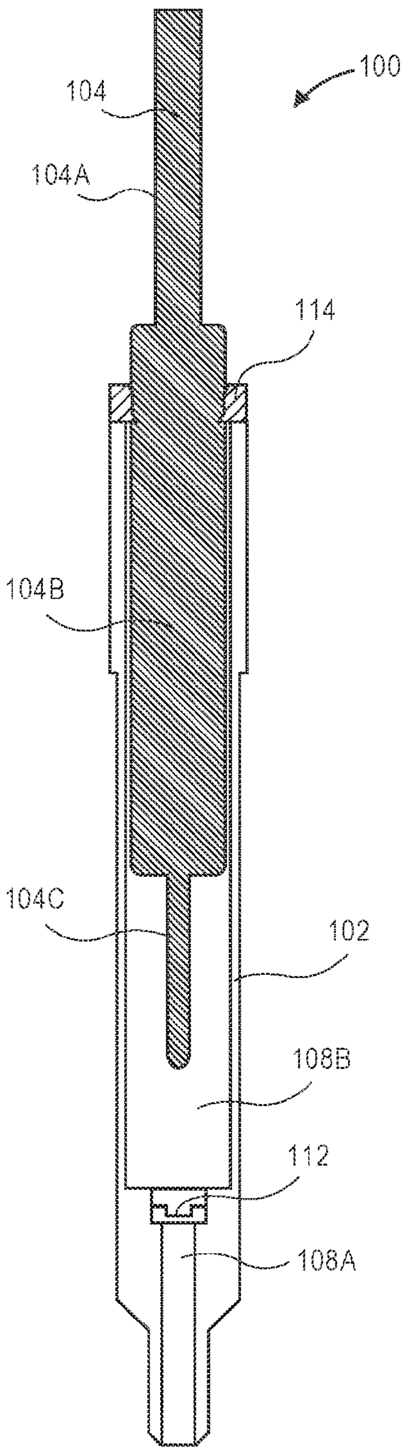
FIG. 3 shows a side, cross-sectional view of the device shown in FIG. 1. The device is shown in a configuration where the device can do high volume pipetting.

FIG. 3 shows a side, cross-sectional view of the device shown in FIG. 1. The device is shown in a configuration where the device 100 does high volume pipetting. As shown in FIG. 3, the piston 104 is pulled upward by an actuator (not shown) that may be coupled to the engagement portion 104A. The drive rod portion 104B then forms a seal with the second seal element 114, thereby allowing liquid to fill the coaxial counterbore 108B and the axial hole 112. The seal path in the first seal element 112 is broken, because the free end portion 104C does not fill the hole in the first seal element 112.

Figure 4:
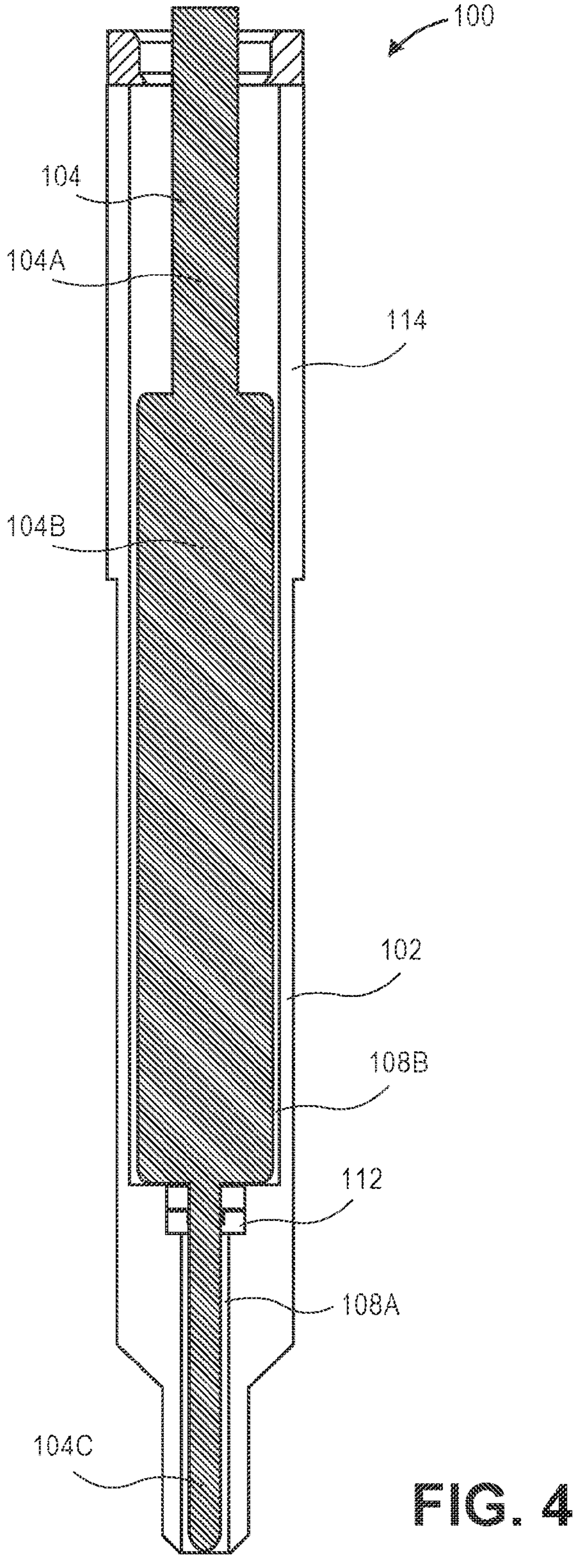
FIG. 4 shows a side, cross-sectional view of the device shown in FIG. 1. The device is shown in a configuration where dead volume is minimized for low volume pipetting.

FIG. 4 shows a side, cross-sectional view of the device shown in FIG. 1. The device is shown in a configuration where dead volume is minimized for low volume pipetting. In FIG. 4, the drive rod portion 104B fills the entire bottom portion of the coaxial counterbore 108B. The free end portion 104C fills the entire axial hole 108A.

Figure 5:
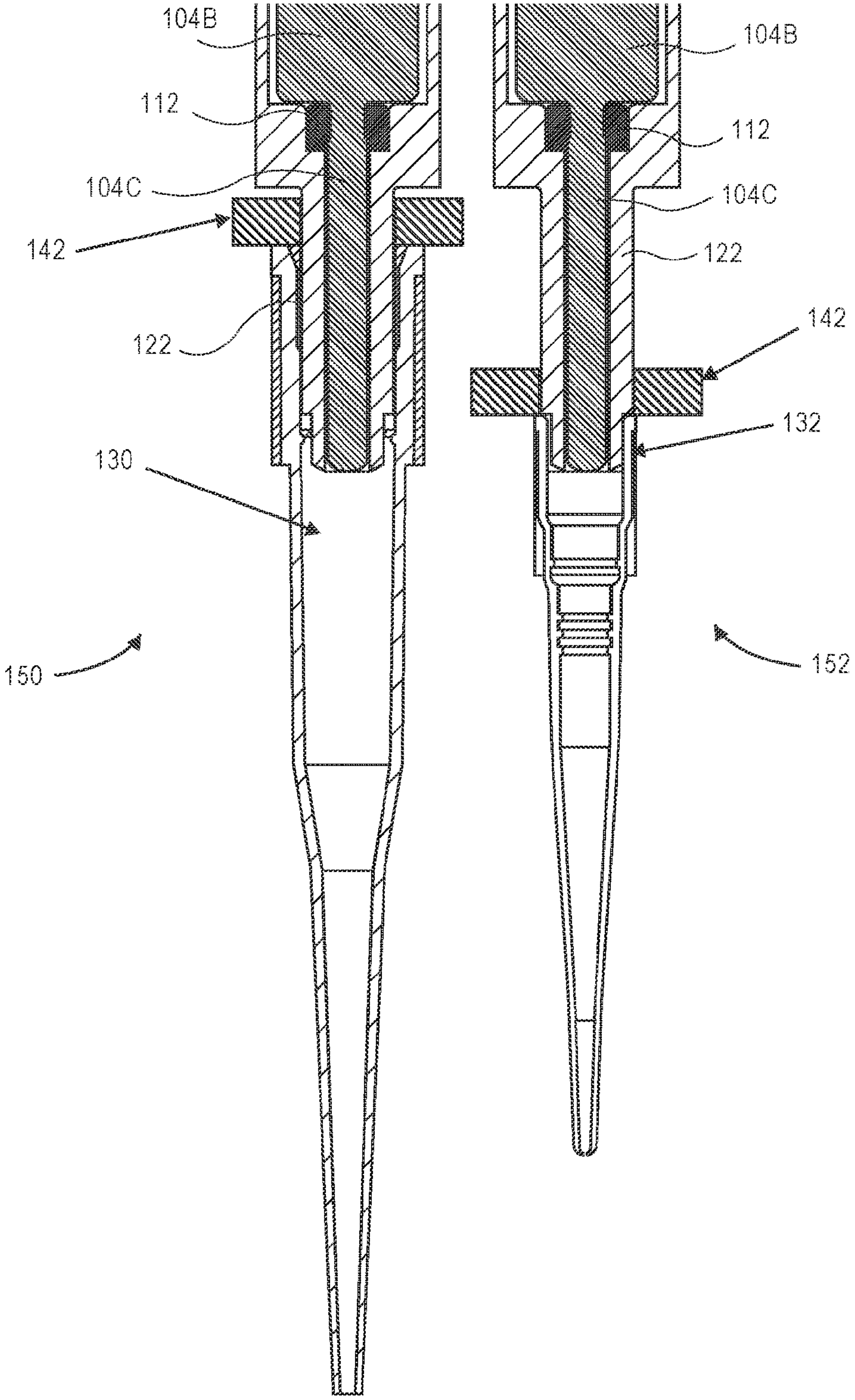
FIG. 5 shows side, cross-sectional views of different devices, with shuck plates.

FIG. 5 shows a side, cross-sectional views of portions of the device 150 when a first pipette tip 130 (e.g., a large volume pipette tip) is attached to the tip 122 of the barrel body 102A through a friction fit. The piston 104 is fully inserted into the barrel 102, and the free end portion 104C of the piston 104 fills the axial hole 108A, but does not extend past an end of the free end portion 104C.

A shuck plate 142 lies above the first pipette tip 130. The shuck plate 142 has a hole that has dimensions that can allow the tip 122 to pass through it, but does not allow the upper end of the first pipette tip 130 to pass through it.

The shuck plate 142 can assist in the removal of the first pipette tip 130 from the tip 122 of the barrel body 102A. In some embodiments, the shuck plate 142 can move downward to push the first pipette tip 130 to separate it from the tip 122 of the barrel body 102A.

FIG. 5 also shows the device 152 when a second pipette tip 132 (e.g., a low volume pipette tip) is attached to the tip 122 of the barrel body 102A through a friction fit. The piston 104 is fully inserted into the barrel 102, and the free end portion 104C of the piston 104 fills the axial hole 108A, but does not extend past an end of the free end portion 104C. The second pipette tip 132 has a different size and different volume than the first pipette tip 130.

Similar to device 150, the shuck plate 142 lies above the small volume pipette tip 132. The shuck plate 142 has a hole that has dimensions that can allow the tip 122 to pass through it, but does not allow the upper end of the small volume pipette tip 132 to pass through it.

The shuck plate 142 can assist in the removal of the small volume pipette tip 132 from the tip 122 of the barrel body 102A. In some embodiments, the shuck plate 142 can move axially, and downward to push the small volume pipette tip 130 to separate it from the tip 122 of the barrel body 102A.

Figure 6:
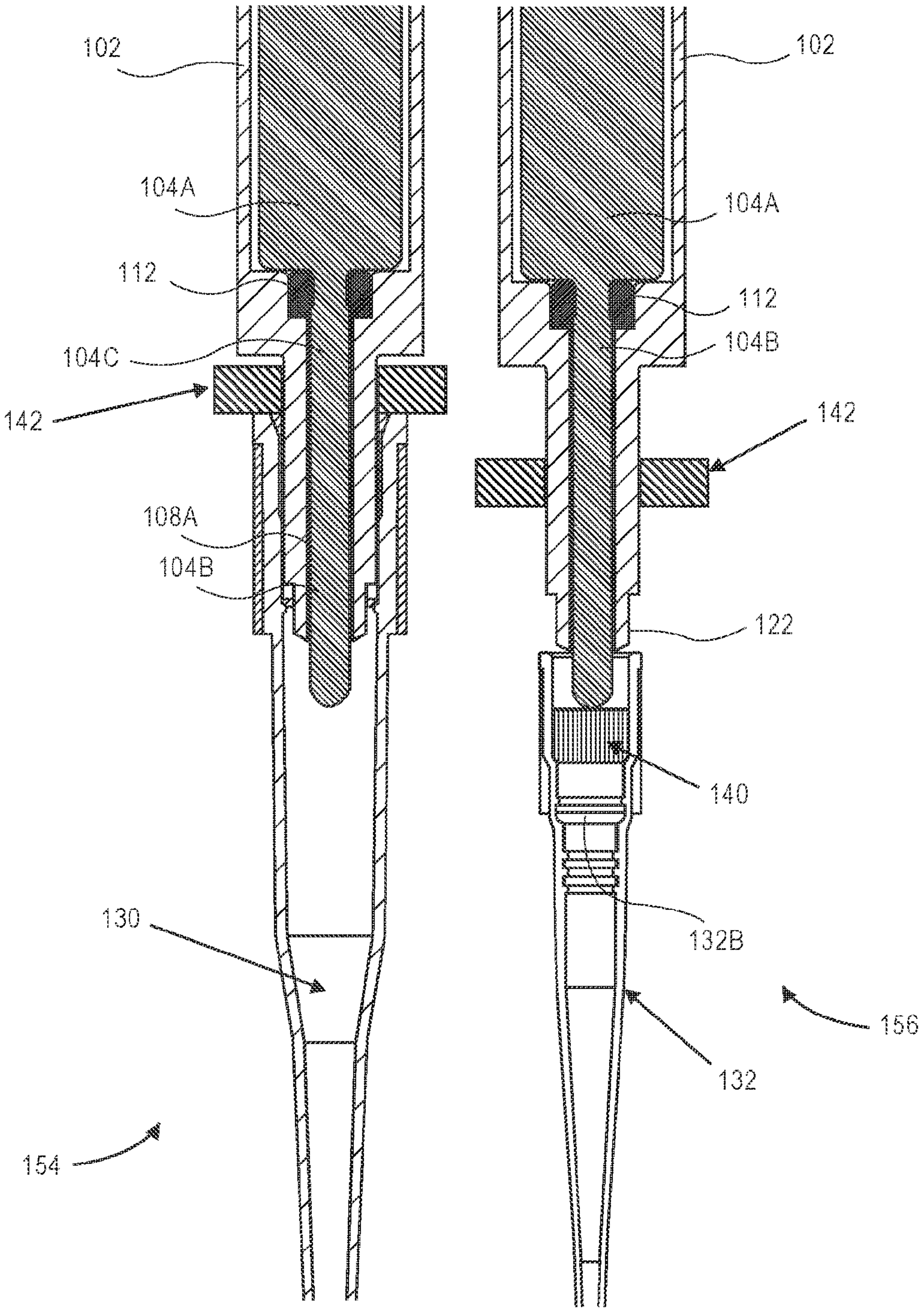
FIG. 6 shows, side, cross-sectional views of different devices, where a piston can serve as a plunger to push off a pipette tip from a tip of a barrel.

FIG. 6 shows two devices 154, 156. Device 154 is substantially similar to device 150 in FIG. 3, except that the end of the free end portion 104B of the piston 104 extends past an end of the tip 122.

FIG. 6 also shows a device 156. Device 156 is similar to device 152 in FIG. 3, except that the end of the free end portion 104B of the piston 104 extends past an end of the tip 122. A length of the free end portion 104B is greater than a length of the axial hole 108A. Also, the second pipette tip 132, which includes a body 132A and a lumen 132B, has a filter barrier 140 in the lumen 140.

The free end portion 104B can act as a plunger. It can first dispense any liquid in the axial hole 108A in the tip 122 of the barrel 102 into an intended container. The free end portion 104B can then stop just above the barrier 140 and move to a tip removal station (not shown). Then, an actuator (not shown) can push the piston 104 further down such that an end of the free end portion 104B contacts the filter barrier 140. The filter barrier 140 is lodged into a stable position in the second portion 132B of the second pipette tip 132 so that the entire second pipette tip 132 will be pushed downward to separate it from the tip 122 of the barrel 102. Note that the filter barrier 140 is an example of a structure that can be engaged by the piston 104 to separate the second pipette tip 132 from the barrel 102. Other structures such as ledges in the pipette tip 132 and the like can be engaged by the piston 104 to separate the pipette tip 132 from the barrel 102.

The tip 122 of the barrel 102 is configured to engage a second pipette tip 132, the second pipette tip 132 having a body 132A forming a lumen 132B, and a barrier 140 spanning the lumen 132B, the pipette tip 130 engaging the barrel 102. The device 156 can be configured to project the free end portion 104B beyond the tip 122 of the barrel 102. When a first pipette tip 132 is engaged to the barrel 102, an end of the free end portion 104B contacts the barrier 140.

The barrel 102 is further configured to engage a second high volume pipette tip 130 sized to fit over the smaller diameter segment of the tip 122 of the barrel 102.

Figure 7A:
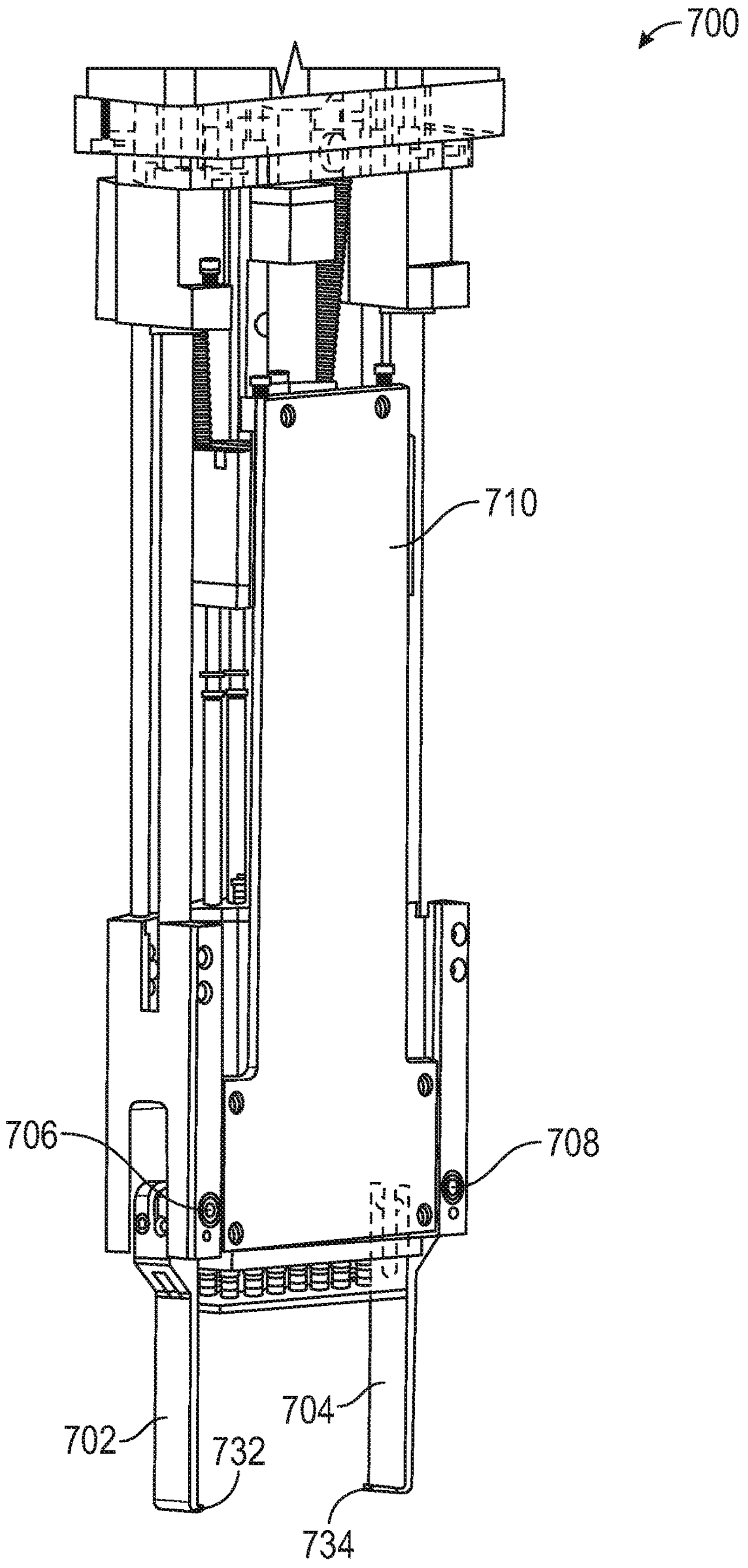
FIG. 7A is a side view of a gripper manifold.
Figure 7B:
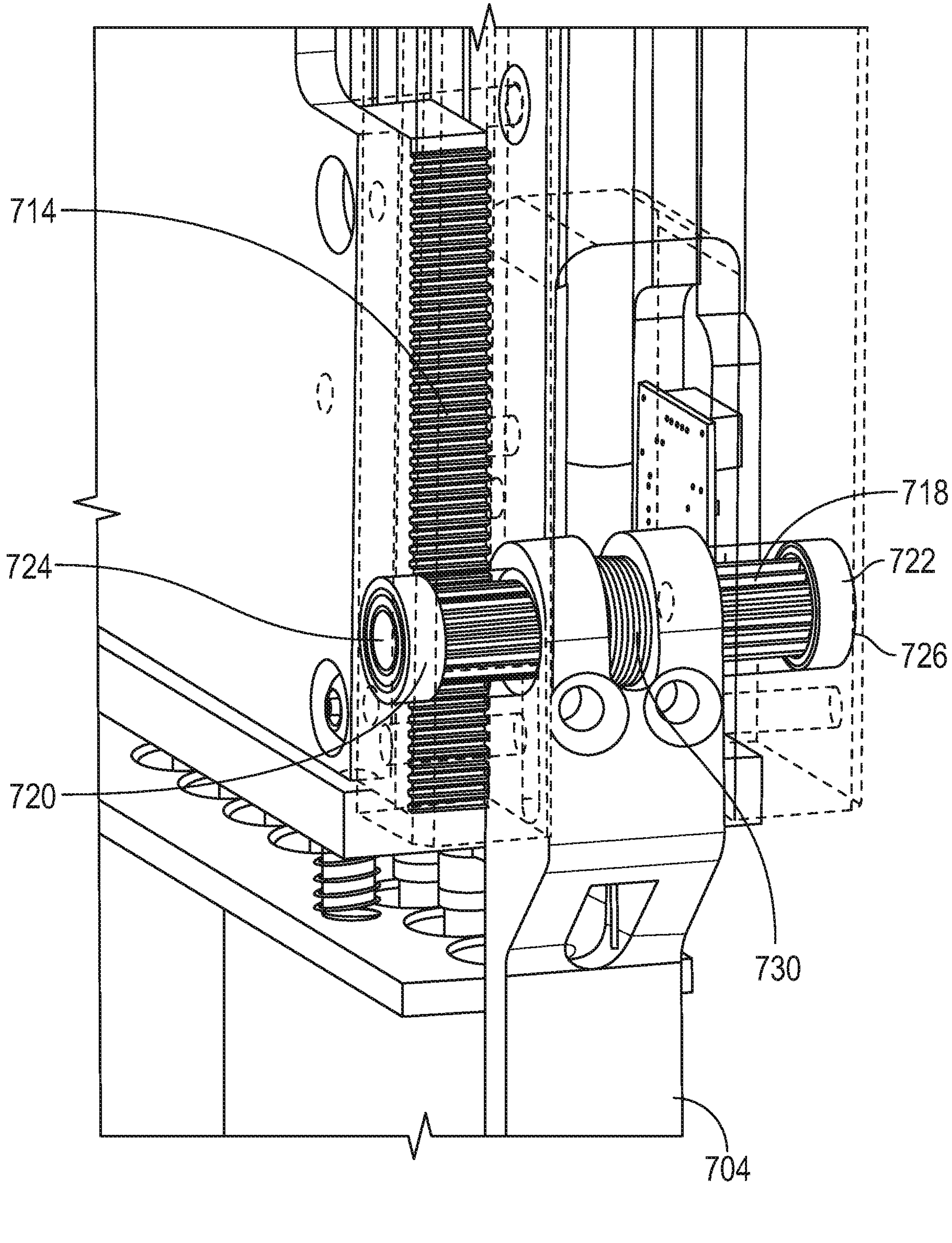
FIG. 7B is an exploded view of a portion of a gripper manifold

A number of alterative embodiments are also possible. In one embodiment, it is possible to eliminate the transition zone and allow for a small pressure build up, while the free end portion (i.e., a small plunger) transitions to the larger plunger for pipetting, or vice versa. In another embodiment, there could be more than two piston diameters. The piston would be stepped as many times as desired to create multiple volume pipetting modes in a single pipetting device. For example, the piston 104 in FIG. 1 could have two steps, such that three different volumes of liquid could be pipetted in a single device. In yet another embodiment, a high volume seal could be at the bottom and the low volume seal could be at the top. In yet another embodiment, two or more mandrel geometries could be used for different hub sizes. In yet another embodiment, the seals could be on the piston and move up and down with the piston instead of being inside the barrels. In still another embodiment, an accessory such as a gripper manifold 700 (FIG. 7A) that can be used to grip, among other things, microtiter plates and lids that would be used with the devices described herein. The gripper comprises two gripper fingers 702 and 704 that are shown in the closed position in FIG. 7A. The gripper fingers 702 and 704 rotate outward about the rotation axes formed by radial bearings 706 and 708. Each gripper finger 702 and 704 can rotate up to about 180 degrees about the rotation axes formed by radial bearings 706 and 708. The gripper can be actuated by the same actuator that is used to move piston 104, such that there is a single actuator responsible for the movement of piston 104 and griper fingers 702 and 704. The gripper bracket 710 is pulled up by a top plunger plate (not shown) which is attached to the same actuator that is used to move piston 104. The gripper bracket 710 is attached to two gear racks 712 and 714, only one of which is shown in FIG. 7B. The gear racks 712 and 714 can be contained in an undercut feature in the gripper manifold 700 and rotate two pinions 716 and 718 as shown in FIG. 7B, with only 718 shown. The gripper fingers 702 and 704 (only 704 shown in FIG. 7B) are attached to each pinion 716 and 718. First and second radial bearings 720 and 722 can be attached to each distal end 724 and 726 of pinions 716 and 718 to reduce any drag on the gear rack/pinion drive. Third and fourth radial bearings associated with gripper finger 702 are not shown in FIG. 7B. The gripper manifold 700 can further comprise torsion springs 728 and 730 (only 730 shown in FIG. 7B), which can wrap around the pinions 716 and 718 to, among other things, keep the fingers stored in an up position when not in used and to remove hysteresis in the gear rack/pinion drive when the fingers are actuated for use in gripping. The gripper fingers can have undercut features 732 and 734 at a distal end of each finger. Further, gripper fingers 702 and 704 can have approximately 2 lbf of gripping force to retain things such as microtiter plates and lids.

Other embodiments of the invention are directed towards methods for using the above-described devices. In some embodiments, the method comprises using a device including (a) a piston including a stepped profile, a drive rod portion and a free end portion extending from the drive rod portion, the free end portion having a smaller diameter than the drive rod portion, (b) a barrel including a barrel body, a stepped bore defined by the barrel body, and a tip formed in the barrel body, the stepped bore having an axial hole and a coaxial counterbore, the axial hole passing through the tip, (c) a first seal element between and engaging the barrel and the free end portion, and (d) a second seal element between and engaging the barrel and the drive rod portion.

Referring to FIG. 3, the method comprises in a first high volume pipetting mode, aspirating a first liquid in a first container by withdrawing the piston 104 from the barrel 102 such that the free end portion 104C is above and moves away from the axial hole 108A. After the liquid is in the coaxial counterbore 108B, the first liquid is dispensed by inserting the piston 104 into the barrel 102 such that the free end portion 104C moves toward the axial hole 108A. This pushes any of the first liquid in the coaxial counterbore 108B and the axial hole 108A into a second intended container. An end configuration can be shown in FIG. 4.

The method further comprises, in a second low volume pipetting mode, aspirating, a second liquid by withdrawing the piston 104 from the barrel 102 such that the free end portion 104C remains in the axial hole 108A and forms a seal with first seal element 112. This configuration is shown in FIG. 1. After the second liquid fills the axial space 108A, the second liquid can be dispensed by inserting the piston 104 into the barrel 102 such that the free end portion 104C remains in the axial hole 108A. An end configuration can be shown in FIG. 4.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety.

What is claimed is:

1. A device for transferring liquid comprising:

a piston comprising a stepped profile, a drive rod portion, and a free end portion extending from the drive rod portion, the free end portion having a different diameter than the drive rod portion;

a barrel comprising a barrel body, and a tip formed in the barrel body, the barrel comprising a larger diameter segment and a smaller diameter segment, wherein the barrel is configured to engage a first pipette tip sized to fit over the larger diameter segment, and wherein the barrel is further configured to engage a second pipette tip sized to fit over the smaller diameter segment of the barrel; and a first seal element between and engaging the barrel and the free end portion;

wherein the barrel comprises a stepped bore defined by the barrel body, the stepped bore comprising an axial hole passing through the tip, the stepped bore further comprising a coaxial counterbore and a bore portion having a diameter that is smaller than a diameter of the counterbore and is larger than a diameter of the axial hole, and wherein the first seal element is fixed to the stepped bore within the bore portion.

2. The device of claim 1, further comprising a second seal element between and engaging the barrel and the drive rod portion.

3. The device of claim 2, wherein a length of the free end portion is greater than a length of the axial hole.

4. The device of claim 2, wherein, the smaller diameter segment coincides with the tip, and the larger diameter segment extends from the smaller diameter segment, and the counterbore disposed within the larger diameter segment.

5. The device of claim 2, further comprising:

a shuck plate disposed around the barrel and configured to move axially with respect to the barrel.

6. The device of claim 2, wherein the second pipette tip has a body forming a lumen, and a barrier spanning the lumen, the second pipette tip engaging the barrel, and wherein, when the second pipette tip is engaged to the barrel, an end of the free end portion can contact the barrier.

7. The device of claim 6, further comprising a shuck plate, wherein when the second pipette tip_is engaged to the barrel, the shuck plate contacts the second pipette tip.

8. The device of claim 2, wherein the piston further comprises an engagement portion extending from the drive rod portion.

9. The device of claim 1, further comprising:

an actuator coupled to the piston for moving the piston up and down.

10. The device of claim 9, further comprising a gripper having at least two gripper fingers, wherein the actuator is further coupled to the gripper for moving the at least two gripper fingers.

11. The device of claim 2, wherein the piston is disposed within the barrel such that at most one of the first seal element and the second seal element engages between the barrel and the piston.

12. The device of claim 1, wherein the second pipette tip includes a filter barrier that can be pushed by the piston to separate the second pipette tip from the barrel.

13. A method of using a device for transferring a liquid comprising (a) a piston comprising a stepped profile, a drive rod portion, and a free end portion extending from the drive rod portion, the free end portion having a different diameter than the drive rod portion, (b) a barrel comprising a barrel body, and a tip formed in the barrel body, the barrel comprising a larger diameter segment and a smaller diameter segment, wherein the barrel is configured to engage a first pipette tip sized to fit over the larger diameter segment, and wherein the barrel is further configured to engage a second pipette tip sized to fit over the smaller diameter segment of the barrel, and (c) a first seal element between and engaging the barrel and the free end portion, wherein the barrel comprises a stepped bore defined by the barrel body, the stepped bore comprising an axial hole passing through the tip, the stepped bore further comprising a coaxial counterbore and a bore portion having a diameter that is smaller than a diameter of the counterbore and is larger than a diameter of the axial hole, and wherein the first seal element is fixed to the stepped bore within the bore portion, the method comprising:

in a first high volume pipetting mode, aspirating a first liquid by withdrawing the piston from the barrel, and dispensing the first liquid using the first pipette tip; and in a second low volume pipetting mode, aspirating, a second liquid by withdrawing the piston from the barrel, and dispensing the second liquid using the second pipette tip.

14. The method of claim 13, wherein the device further comprises a second seal element between and engaging the barrel and the drive rod portion, and wherein in the first high volume pipetting mode, the first liquid is aspirated by withdrawing the piston from the barrel such that the free end portion is above and moves away from the axial hole, and the first liquid is dispensed by dispensing the first liquid by inserting the piston into the barrel such that the free end portion moves toward the axial hole; and wherein in a second low volume pipetting mode, the second liquid aspirated by withdrawing the piston from the barrel such that the free end portion remains in the axial hole, and the second liquid is dispensed by inserting the piston into the barrel such that the free end portion remains in the axial hole.

15. A device for transferring liquid comprising:

a first pipette tip;

a second pipette tip having a different volume than the first pipette tip;

a piston comprising a stepped profile, a drive rod portion, and a fee end portion extending from the drive rod portion, the free end portion having a different diameter than the drive rod portion;

a barrel comprising a barrel body and a tip, wherein the tip is configured to engage the first pipette tip through a friction fit, and wherein the tip is further configured to engage the second pipette tip through a friction fit, wherein the barrel comprises a stepped bore defined by the barrel body, the stepped bore comprising an axial hole and a coaxial counterbore, the axial hole passing through the tip;

a first seal element between and engaging the barrel and the free end portion; and a second seal element between and engaging the barrel and the drive rod portion;

wherein the piston is disposed within the barrel such that at most one of the first seal element and the second seal element engages between the barrel and the piston;

wherein, in a first high volume pipetting mode using the first pipette tip, the device is configured to aspirate a liquid by withdrawing the piston from the barrel such that the free end portion is above and moves away from the axial hole, and to dispense the liquid by inserting the piston into the barrel such that the free end portion moves toward the axial hole;

wherein, in a second low volume pipetting mode using the second pipette tip, the device is configured to aspirate a liquid by withdrawing the piston from the barrel such that the free end portion remains in the axial hole, and to dispense the liquid by inserting the piston into the barrel such that the free end portion remains in the axial hole.

* * * * *